(12) United States Patent
Wu et al.

(10) Patent No.: US 11,429,195 B2
(45) Date of Patent: Aug. 30, 2022

(54) SELF-HEALING KEYBOARDS

(71) Applicant: HEWLETT-PACKARD DEVELOPMENT COMPANY, L.P., Spring, TX (US)

(72) Inventors: Kuan-Ting Wu, Taipei (TW); Hung-Ming Chen, Taipei (TW); Chih Chen Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 328 days.

(21) Appl. No.: 16/617,947

(22) PCT Filed: Jul. 6, 2017

(86) PCT No.: PCT/US2017/040795
§ 371 (c)(1),
(2) Date: Nov. 27, 2019

(87) PCT Pub. No.: WO2019/009896
PCT Pub. Date: Jan. 10, 2019

(65) Prior Publication Data
US 2020/0192491 A1 Jun. 18, 2020

(51) Int. Cl.
*G06F 3/02* (2006.01)
*C08G 77/16* (2006.01)
(Continued)

(52) U.S. Cl.
CPC .......... *G06F 3/0202* (2013.01); *C08G 77/16* (2013.01); *C08J 5/18* (2013.01); *C08J 7/043* (2020.01);
(Continued)

(58) Field of Classification Search
CPC ..... G06F 3/0202; G06F 3/0219; C08G 77/16; C08G 77/18; C08J 5/18; C08J 7/043;
(Continued)

(56) References Cited

U.S. PATENT DOCUMENTS 6,902,791 B2   6/2005   Kawasato et al.
7,884,295 B2   2/2011   Aoki
(Continued)

FOREIGN PATENT DOCUMENTS

CN   103468231 A   12/2013
CN   105780945 A    7/2016
(Continued)

OTHER PUBLICATIONS

Sebastian Anthony—Scientist create self-healing protective coating, deliver killing blow to screen—on Jul. 20, 2012 protectors (https: www.extremetech.com/author/santhony).
(Continued)

*Primary Examiner* — Ibrahim A Khan
(74) *Attorney, Agent, or Firm* — HPI Patent Department

(57) ABSTRACT

The present subject matter relates to self-healing keyboards. In an example implementation, a self-healing keyboard of an electronic device comprises a self-healing film having a self-healing layer disposed over a keyboard. The self-healing layer is composed of polyurethane, epoxy vinyl ester, epoxy, polyurethane microcapsules filled with silane compound, and a polysiloxane mixture.

13 Claims, 7 Drawing Sheets

(51) Int. Cl.
*C08J 5/18* (2006.01)
*C08J 7/043* (2020.01)
*C08J 7/046* (2020.01)

(52) U.S. Cl.
CPC ............ *C08J 7/046* (2020.01); *G06F 3/0219* (2013.01); *C08J 2300/26* (2013.01); *C08J 2375/04* (2013.01)

(58) Field of Classification Search
CPC .... C08J 7/046; C08J 2300/26; C08J 2375/04; C08J 7/0427; C08J 2367/00; C08J 2369/00; C08J 2463/00; C08J 2463/10; C08J 2475/04; C08J 2483/04; C08L 83/06; C08L 2205/20; C09D 183/06; C09D 163/10
See application file for complete search history.

(56) References Cited

U.S. PATENT DOCUMENTS

| | | | | |
|---|---|---|---|---|
| 9,550,855 | B2* | 1/2017 | Benkoski | C09D 163/00 |
| 9,634,426 | B2 | 4/2017 | Nazzaro et al. | |
| 2007/0166542 | A1* | 7/2007 | Braun | C08L 101/00 428/402.21 |
| 2009/0191402 | A1* | 7/2009 | Beiermann | B32B 27/12 428/221 |
| 2010/0075134 | A1* | 3/2010 | Blaiszik | C08G 59/502 523/400 |
| 2015/0097271 | A1 | 4/2015 | Ayotte | |
| 2016/0320803 | A1* | 11/2016 | Oh | B32B 27/281 |
| 2018/0201802 | A1* | 7/2018 | Sakuramoto | C09D 5/08 |
| 2018/0223127 | A1* | 8/2018 | Cho | C08L 71/02 |
| 2018/0267640 | A1* | 9/2018 | Virgili | G06F 3/016 |
| 2018/0361719 | A1* | 12/2018 | Kikuchi | B32B 15/082 |

FOREIGN PATENT DOCUMENTS

| | | |
|---|---|---|
| CN | 206201621 U | 5/2017 |
| JP | 2005025960 A | 1/2005 |
| JP | 2007058297 A | 3/2007 |

OTHER PUBLICATIONS

Nanocoatings, Aug. 2014, <http://www.nanotechmag.com/wp-content/uploads/2014/09/NanoCoatings-2014.pdf>.

* cited by examiner

SELF-HEALING KEYBOARDS

BACKGROUND

Electronic devices, such as mobile phones, computers, and laptops, may have a keyboard. The keyboard may include a plurality of keys which facilitate in providing input to the electronic device. Accordingly, a user can perform a variety of input operations on the electronic device through the keyboard.

BRIEF DESCRIPTION OF DRAWINGS

The following detailed description references the drawings, wherein.

DETAILED DESCRIPTION

Figure 1:
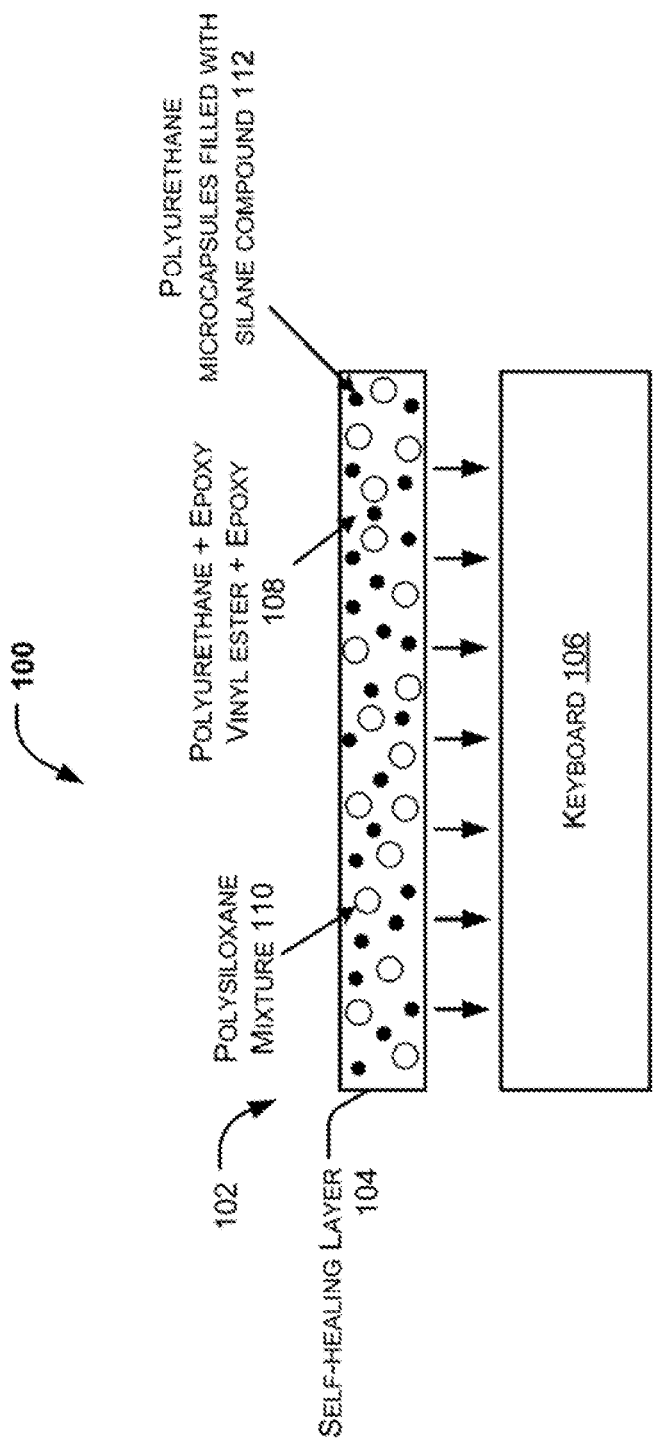
FIG. 1 illustrates a sectional view of a self-healing keyboard, according to an example implementation of the present subject matter.

Electronic devices, such as a personal computer, a laptop, a phone, and a personal digital assistant, include a housing for accommodating various components, such as circuit boards having sensitive electronic components. The electronic devices may also include a keyboard disposed on the housing. The keyboard functions as an input device through which a user can perform a variety of input operations on the electronic device.

Usually, the keyboards are more prone to wear and tear as the keyboard comes in contact of a user. For example, regular and rough usage of the keyboards may lead to scratches on surface of keys of the keyboards, thereby adversely affecting the appearance and functionality of the keyboards. Moreover, a keyboard may get damaged due to spillage of liquids. Spilled liquids may reach the circuit underneath the keyboard, which may result in electronic components being ruined.

To protect the keyboards from accidental spillage, the keyboards are coated with a silicone layer. The silicone layer, however, provides poor typing experience and is prone to receive scratch marks on its surface. This may lead to frequent replacement of the silicone layer, thereby imposing additional burden and cost on the users.

The present subject matter describes keyboards that are waterproof and can heal or repair scratches on their surface on their own. The present subject matter also describes methods of fabricating such keyboards. The present subject matter further describes self-healing films which when applied on keyboards make the keyboards self-healable.

In accordance with the present subject matter, scratches on the keyboards can heal on their own substantially quickly, for example within 3 seconds, and even at a low temperature of 5° C. The self-healing property of the keyboards makes them robust, and avoids use and replacement of silicone layers on top, which provides a better user experience of the keyboards. Further, the self-healing films are applied on the keyboards in a continuous manner to cover the keyboards, thereby making the keyboards spill-proof and provide a comfortable typing experience.

In an example implementation of the present subject matter, a keyboard includes a self-healing film disposed thereon. The self-healing film includes a substrate and a self-healing layer. The self-healing layer is composed of polyurethane, epoxy vinyl ester, epoxy, polyurethane microcapsules filled with silane compound, and a polysiloxane mixture. The polysiloxane mixture may be encapsulated or phase-separated and include poly-dimethylsiloxane (PDMS) resin, hydroxy end-functionalized PDMS (HOPDMS), and poly-diethoxysiloxane (PDES), and a combination thereof. The disposal of the self-healing film on the keyboard along with the composition of the self-healing film enables self-healing and waterproofing of the keyboard.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a sectional view of a self-healing keyboard 100, according to an example implementation of the present subject matter. The self-healing keyboard 100 may be implemented in an electronic device, such as a personal computer, a laptop, a phone, a remote control, and a personal digital assistant (PDA).

The self-healing keyboard 100 includes a self-healing film 102 disposed thereon. The self-healing film 102 is composed of a self-healing layer 104 disposed on a top surface of a keyboard 106. The self-healing layer 104 is composed of polyurethane, epoxy vinyl ester, and epoxy 108 in the form of a base matrix. The base matrix is embedded with a polysiloxane mixture 110 and polyurethane microcapsules filled with silane compound 112. The polysiloxane mixture 110 includes poly-dimethyisiloxane (PDMS) resin, hydroxy end-functionalized PDMS (HOPDMS), and poly-diethoxysiloxane (PDES), and a combination thereof. The polysiloxane mixture 110 may be encapsulated or phase-separated. The polysiloxane mixture 110 may be encapsulated using a urea-formaldehyde encapsulation procedure.

The polyurethane microcapsules may be polyurethane shells filled with silane compound. The silane compound is released when the microcapsules are ruptured due to mechanical damage. The silane compound may be mixed with chlorobenzene before encapsulating in the polyurethane microcapsules. The polyurethane microcapsules may be formed through an interfacial polymerization procedure.

In an example implementation, polyurethane in the self-healing layer 104 has a concentration in a range of 60% to 80% by volume, epoxy vinyl ester in the self-healing layer 104 has a concentration in a range of 10% to 15% by volume, and epoxy in the self-healing layer 104 has a concentration in a range of 10% to 15% by volume. Further, the polyurethane microcapsules in the self-healing layer 104 has a concentration in a range of 0.01% to 0.3% by volume, and the polysiloxane mixture in the self-healing layer 104 has a concentration in a range of 1% to 3% by volume.

In an example implementation, the self-healing layer 104 may have a thickness in a range of about 15 μm to 100 μm. The base matrix of polyurethane, polyester, and epoxy forms an interpenetrating macromolecular network that provides high impact strength, high toughness, and high wear resistance to the self-healing layer 104 and thus to the self-healing keyboard 100. The polysiloxane mixture 110 in the self-healing layer 104 functions as a healing agent, and silane compound, filled in polyurethane microcapsules 112, functions as a coupling agent for polymerization within the self-healing layer 104.

A scratch on the self-healing keyboard 100 damages the self-healing layer 104, which causes a crack in the base matrix. The crack in the base matrix ruptures the polyurethane microcapsules filled with silane compound 112, which causes silane compound to mix with the polysiloxane mixture 110, polyurethane, epoxy vinyl ester, and epoxy 108 within the self-healing layer 104. Mixing of silane compound initiates polymerization within the self-healing layer 104 which heals the crack within 3 seconds from the time of scratch and even at a low temperature of 5° C.

Figure 2:
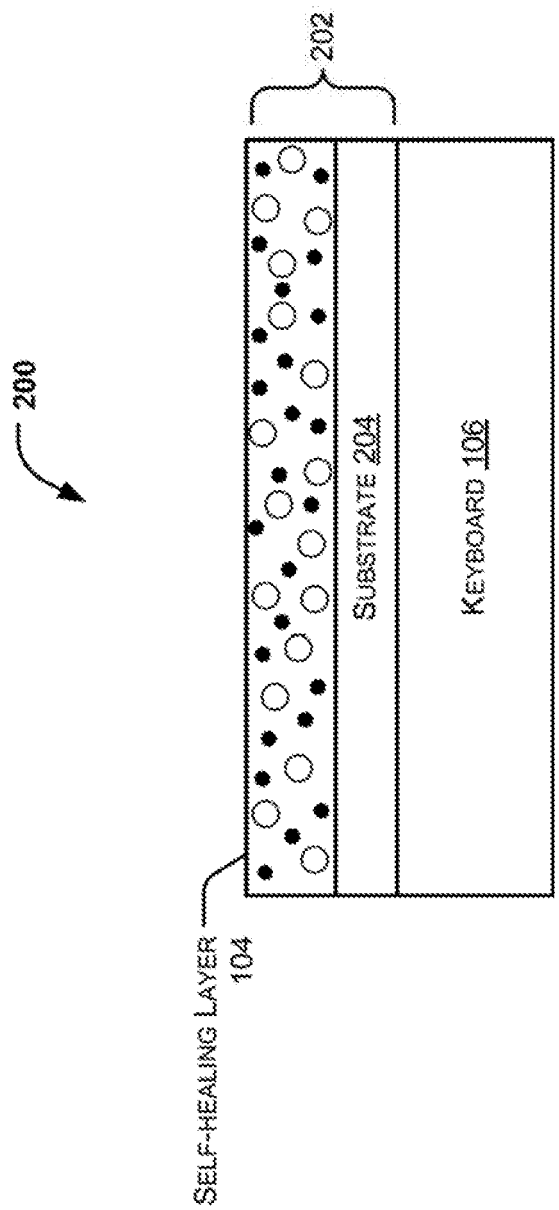
FIG. 2 illustrates a sectional view of a self-healing keyboard, according to an example implementation of the present subject matter.

FIG. 2 illustrates a sectional view of a self-healing keyboard 200, according to an example implementation of the present subject matter. The self-healing keyboard 200 includes a self-healing film 202 disposed over the keyboard 106. The self-healing film 202 includes a substrate 204 and the self-healing layer 104 deposited on the substrate 204. The self-healing layer 104 is the same as the self-healing layer described through the description of FIG. 1. In an example, the substrate 204 is disposed on the keyboard 106 such that the self-healing film 202 interfaces with the keyboard 106 through the substrate 204.

The substrate 204 is of a material from one of elastomers, polyester, and polycarbonate, or a combination thereof. In an example, the elastomers may include polyisoprene, polybutadiene, chloroprene rubber, butyl rubber, styrene-butadiene rubber, nitrile rubber, hydrogenated nitrile rubbers, ethylene propylene rubber, ethylene propylene diene monomer (EPDM) rubber, silicone rubber, polyether block amides (PEBA), chlorosulfonated polyethylene, ethylene-vinyl acetate (EVA), polysulfide rubber, thermoplastic urethane, thermoplastic elastomers, or a combination thereof.

In an example implementation, the substrate 204 may have a thickness in a range of about 25 μm to 900 μm. The self-healing layer 104 is deposited over the substrate 204. The self-healing layer 104 may be coated on the substrate 204 through spray coating. The self-healing layer 104 provides a comfortable typing experience to a user. After coating the self-healing layer 104, the substrate 204 may be heated at a temperature in a range of 60° C. to 150° C. for a time duration in a range of 3 minutes to 60 minutes for curing the self-healing layer 104. Thereafter, the substrate 204 may undergo a molding process to conform a shape of the substrate 204 with a shape of the keyboard on which the substrate 204 is to be disposed.

Figure 3:
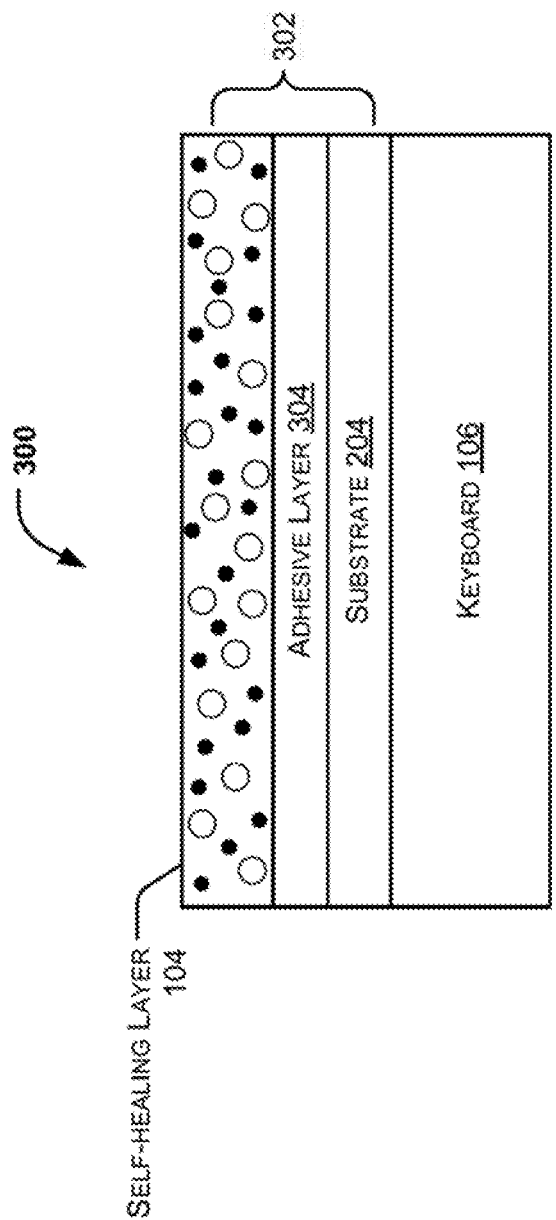
FIG. 3 illustrates a sectional view of a self-healing keyboard, according to an example implementation of the present subject matter.

FIG. 3 illustrates a sectional view of a self-healing keyboard 300, according to an example implementation of the present subject matter. The self-healing keyboard 300 includes a self-healing film 302 disposed over the keyboard 106. The self-healing film 302 includes the self-healing layer 104 attached to the substrate 204 by an adhesive layer 304. The self-healing layer 104 is the same as the self-healing layer described through the description of FIG. 1. The substrate 204 is same as the substrate described through the description of FIG. 2.

In an example implementation, before coating the adhesive layer 304, a surface of the substrate 204 may be cleaned. Further, the adhesive layer 304 may be coated on the substrate 204 through a spray coating technique, a spin-coating technique, an extrusion coating technique or a lamination technique. The adhesive layer 304 may have a thickness in a range of about 1 μm to 30 μm. The adhesive layer 304 may be a viscoelastic adhesive layer which exhibits both viscous and elastic characteristics when the substrate 204 is disposed over the keyboard 106. In an example, the adhesive layer 304 may include urethane-acrylate, silicone, cyclic olefin copolymer, polyacrylic, polycarbonate, or a combination thereof.

Once the adhesive layer 304 is coated on the substrate 204, the self-healing layer 104 is deposited on the adhesive layer 304. In an example, the self-healing layer 104 is deposited on the adhesive layer 304 through spray coating.

Figure 4:
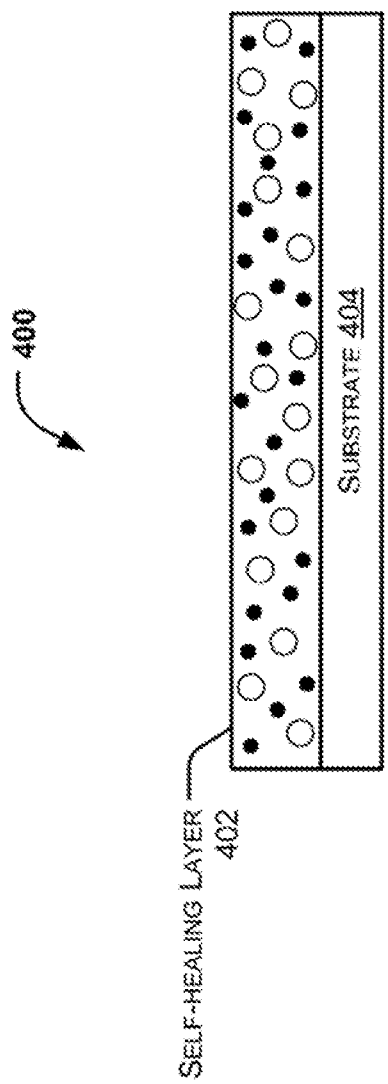
FIG. 4 illustrates a sectional view of a self-healing film, according to an example implementation of the present subject matter.

FIG. 4 illustrates a sectional view of a self-healing film 400, according to an example implementation of the present subject matter. The self-healing film 400 can be disposed on a keyboard of an electronic device, to enable self-healing of the keyboard. A keyboard with the self-healing film 400 pasted on it can self-heal from scratches within 3 seconds from the time of scratch and over a wide temperature range starting from 5° C.

The self-healing film 400 includes a self-healing layer 402 coated on a substrate 404. The self-healing layer 402 is the same as the self-healing layer 104 described through the description of FIG. 1. The substrate 404 is same as the substrate described earlier. In an example, the self-healing layer 402 may be coated on the substrate 404 through spray coating. The self-healing layer 402 may have a thickness in a range of about 15 μm to 100 μm, and includes polyurethane, epoxy vinyl ester, epoxy, polyurethane microcapsules filled with silane compound, and a polysiloxane mixture.

Figure 5:
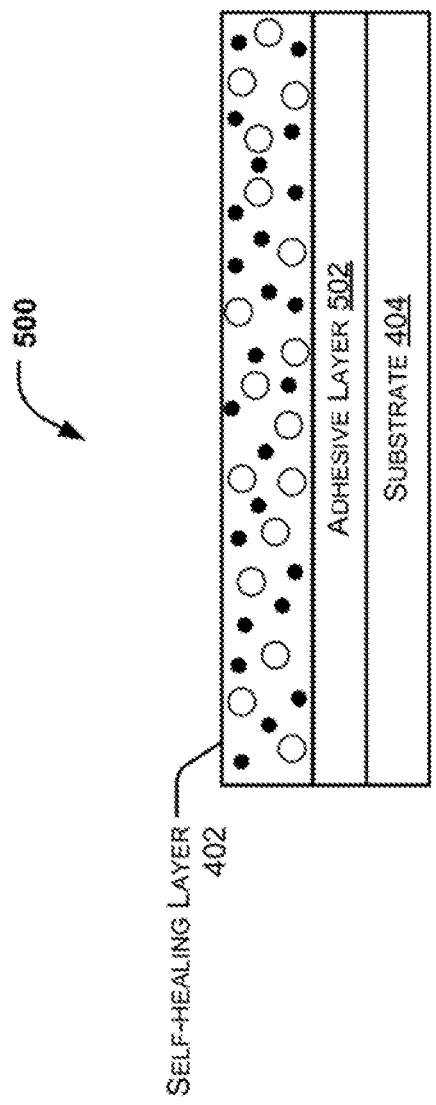
FIG. 5 illustrates a sectional view of a self-healing film, according to an example implementation of the present subject matter.

FIG. 5 illustrates a sectional view of a self-healing film 500, according to an example implementation of the present subject matter. The self-healing film 500, as shown, has an adhesive layer 502 between the self-healing layer 402 and the substrate 404. The self-healing layer 402 is the same as the self-healing layer 104 described through the description of FIG. 1. The adhesive layer 502 is the same as the adhesive layer 304 described through the description of FIG. 3. The self-healing film 500 with the adhesive layer 502 between the self-healing layer 402 and the substrate 404 may be used for keyboards.

Figure 6:
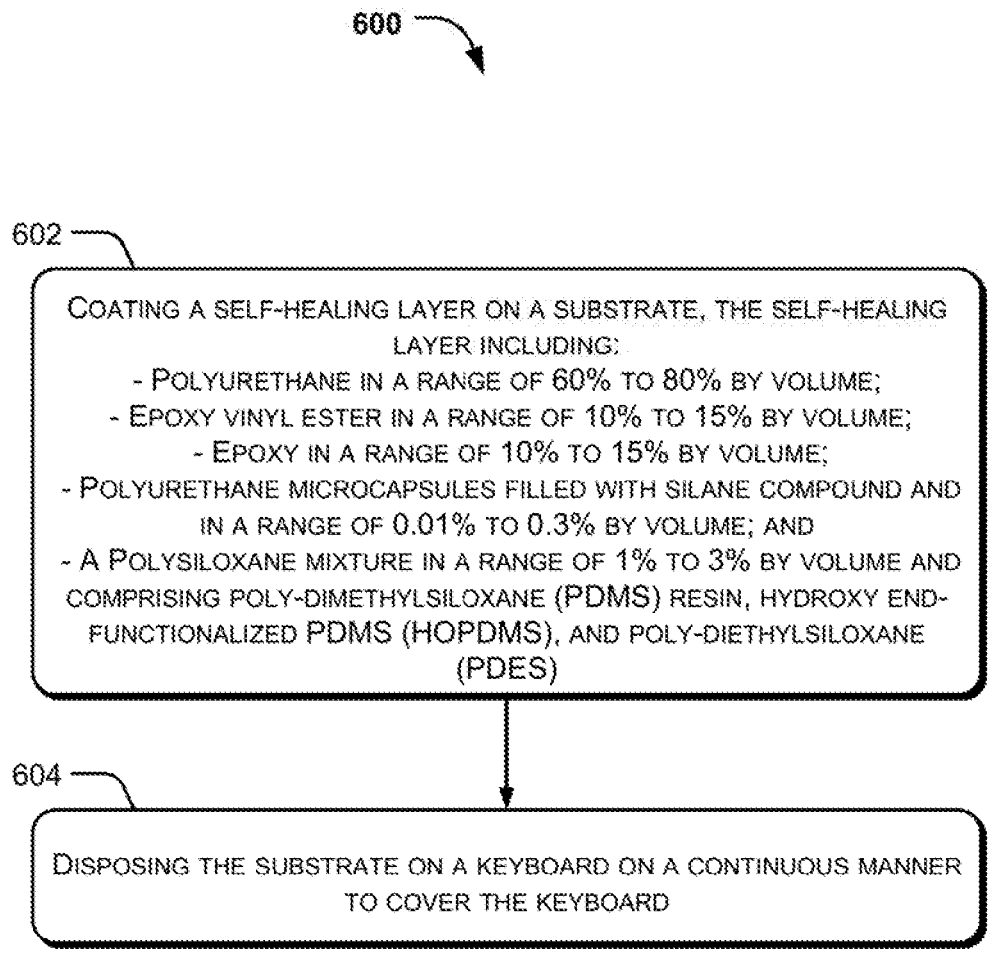
FIG. 6 illustrates a method of fabricating a self-healing keyboard of an electronic device, according to an example implementation of the present subject matter.

FIG. 6 illustrates a method 600 of fabricating a self-healing keyboard of an electronic device, according to an example implementation of the present subject matter. At block 602 of the method 600, a self-healing layer is coated on a substrate, where the self-healing layer includes polyurethane in a range of 60% to 80% by volume, epoxy vinyl ester in a range of 10% to 15% by volume, epoxy in a range of 10% to 15% by volume, polyurethane microcapsules filled with silane compound and in a range of 0.01% to 0.3% by volume, and a polysiloxane mixture in a range of 1% to 3% by volume. The polysiloxane mixture includes polydimethylsiloxane (PDMS) resin, hydroxy end-functionalized PDMS (HOPDMS), and poly-diethoxysiloxane (PDES). The polysiloxane mixture may be encapsulated or phase-separated. The self-healing layer may have a thickness in a range of about 15 μm to 100 μm.

At block 604 of the method 600, the substrate, with the self-healing layer, is disposed on the keyboard in a continuous manner to completely cover the keyboard. In an example, the substrate is applied on the keyboard to cover all keys of the keyboard thereby preventing any spilled liquid from entering the keyboard.

Figure 7:
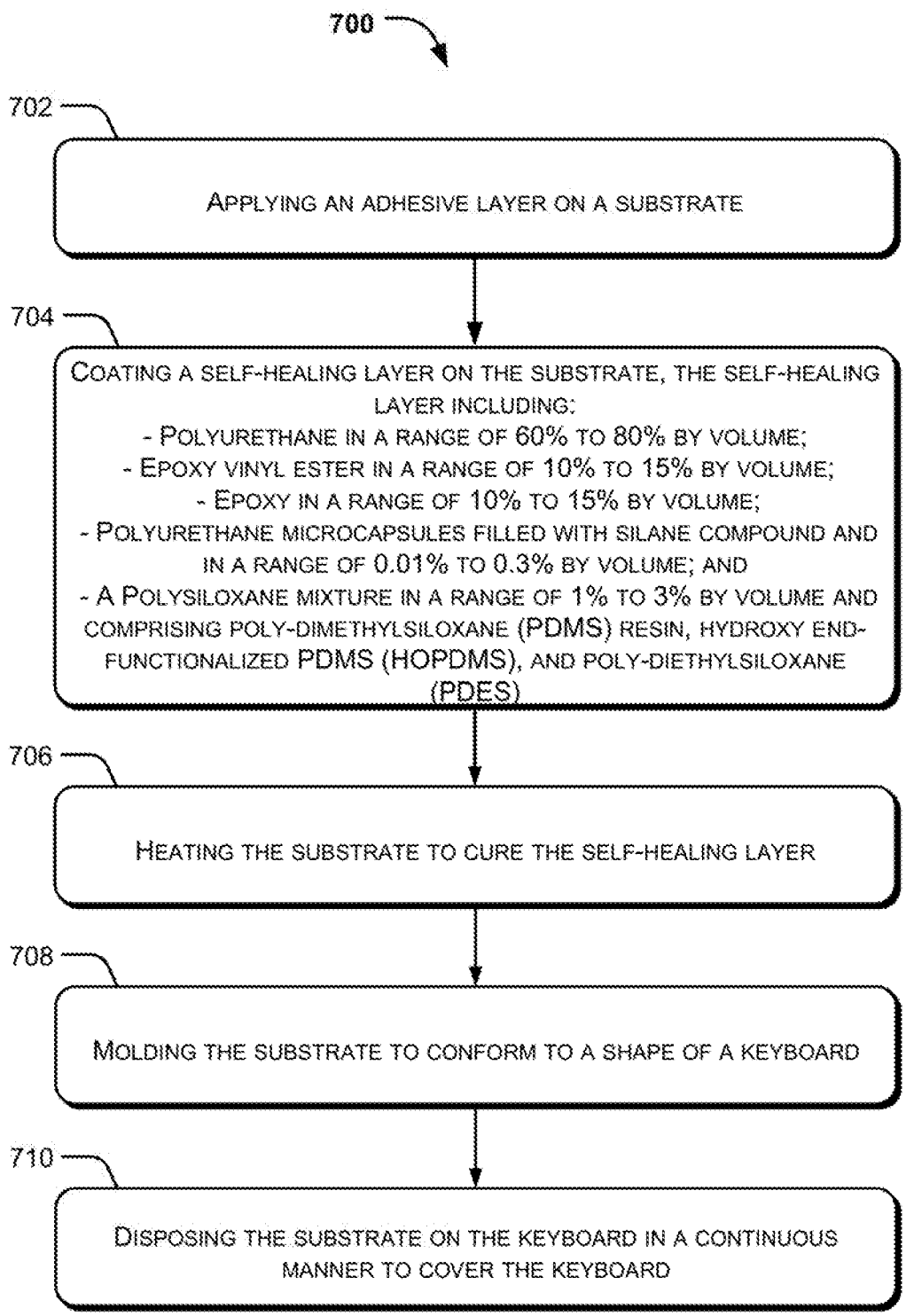
FIG. 7 illustrates a method of fabricating a self-healing keyboard of an electronic device, according to an example implementation of the present subject matter.

FIG. 7 illustrates a method 700 of fabricating a self-healing keyboard of an electronic device, according to an example implementation of the present subject matter. At block 702 of the method 700, an adhesive layer may be applied on a substrate. The substrate may be made of a material selected from one of elastomers, polyester, and polycarbonate and may have a thickness in a range of about 25 μm to 900 μm. Further, the adhesive layer may be coated on the substrate through a spray coating technique, a spin-coating technique, an extrusion coating technique or a lamination technique. The adhesive layer may have a thickness in a range of about 1 μm to 30 μm, and includes urethane-acrylate, silicone, cyclic olefin copolymer, polyacrylic, polycarbonate, or a combination thereof. In an example, a surface of the substrate may be cleaned before coating the adhesive layer.

At block 704, a self-healing layer is coated on the adhesive layer, where the self-healing layer includes polyurethane in a range of 60% to 80% by volume, epoxy vinyl ester in a range of 10% to 15% by volume, epoxy in a range of 10% to 15% by volume, polyurethane microcapsules filled with silane compound and in a range of 0.01% to 0.3% by volume, and a polysiloxane mixture in a range of 1% to 3% by volume and included poly-dimethylsiloxane (PDMS) resin, hydroxy end-functionalized PDMS (HOPDMS), and poly-diethoxysiloxane (PDES). The polysiloxane mixture may be encapsulated or phase-separated. The self-healing layer may have a thickness in a range of about 15 μm to 100 μm. In an example, the self-healing layer may be deposited on the adhesive layer through spray coating.

At block 706 of the method 700, after coating the self-healing layer, the substrate may be heated at a temperature in a range of 60° C. to 150° C. for a time duration in a range of 3 minutes to 40 minutes for curing the self-healing layer.

At block 708 of the method 700, the substrate is molded to conform to a shape of the keyboard on which the substrate is to be disposed. In an example, the substrate is molded using an injection molding technique, compression molding technique, or a blow molding technique.

At bock 710 of the method 700, the substrate is disposed on the keyboard in a continuous manner so as to cover the keyboard. As the substrate is molded in accordance with the shape of the keyboard, the substrate covers all keys of the keyboard, thereby making the keyboard water-proof. In an example, the substrate may be attached to the keyboard using an adhesive or through thermal bonding.

Although implementations for keyboards, self-healing films, and methods of fabrication of keyboards have been described in language specific to methods and/or structural features, it is to be understood that the present subject matter is not limited to the specific methods or features described. Rather, the methods and specific features are disclosed and explained as example implementations for keyboards, self-healing films, and methods of fabrication of keyboards.

We claim:

1. A self-healing keyboard of an electronic device, comprising:
    a self-healing film disposed over a keyboard, the self-healing film comprising a self-healing layer, the self-healing layer comprising polyurethane, epoxy vinyl ester, epoxy, polyurethane microcapsules filled with silane compound, and a polysiloxane mixture, wherein:
    the polyurethane is in a range of 60% to 80% by volume;
    the epoxy vinyl ester is in a range of 10% to 15% by volume;
    the epoxy is in a range of 10% to 15% by volume;
    the polyurethane microcapsules are in a range of 0.01% to 0.3% by volume; and
    the polysiloxane mixture is in a range of 1% to 3% by volume.

2. The self-healing keyboard as claimed in claim 1, wherein the polysiloxane mixture comprises any one of poly-dimethylsiloxane (PDMS) resin, hydroxy end-functionalized PDMS (HOPDMS), poly-diethoxysiloxane (PDES), or a combination thereof.

3. The self-healing keyboard as claimed in claim 1, wherein the self-healing layer has a thickness in a range of about 15 μm to 100 μm.

4. The self-healing keyboard as claimed in claim 1, wherein the self-healing film comprises a substrate, wherein the self-healing layer is deposited over the substrate, such that the self-healing film interfaces with the keyboard through the substrate.

5. The self-healing keyboard as claimed in claim 4, wherein the substrate is of a material selected from one of elastomers, polyester, polycarbonate, or a combination thereof.

6. The self-healing keyboard as claimed in claim 4, wherein the substrate has a thickness in a range of about 25 μm to 900 μm.

7. A self-healing film comprising:
    a substrate having a thickness in a range of about 25 μm to 900 μm; and
    a self-healing layer deposited on the substrate, having a thickness in a range of about 15 μm to 100 μm, wherein the self-healing layer comprises polyurethane, epoxy vinyl ester, epoxy, polyurethane microcapsules filled with silane compound, and a polysiloxane mixture, wherein:
    the polyurethane is in a range of 60% to 80% by volume;
    the epoxy vinyl ester is in a range of 10% to 15% by volume;
    the epoxy is in a range of 10% to 15% by volume;
    the polyurethane microcapsules are in a range of 0.01% to 0.3% by volume; and
    the polysiloxane mixture is in a range of 1% to 3% by volume.

8. The self-healing film as claimed in claim 7, wherein the polysiloxane mixture comprises any one of poly-dimethylsiloxane (PDMS) resin, hydroxy end-functionalized PDMS (HOPDMS), poly-diethoxysiloxane (PDES), or a combination thereof.

9. The self-healing film as claimed in claim 7, wherein the substrate is of a material selected from one of elastomers, polyester, polycarbonate, or a combination thereof.

10. A method of fabricating a self-healing keyboard of an electronic device, the method comprising:
    coating a self-healing layer on a substrate, the self-healing layer comprising:
        polyurethane in a range of 60% to 80% by volume;
        epoxy vinyl ester in a range of 10% to 15% by volume;
        epoxy in a range of 10% to 15% by volume; and
        polyurethane microcapsules filled with silane compound and in a range of 0.01% to 0.3% by volume; and
        a polysiloxane mixture in a range of 1% to 3% by volume and comprising any one of poly-dimethylsiloxane (PDMS) resin, hydroxy end-functionalized PDMS (HOPDMS), poly-diethoxysiloxane (PDES), or a combination thereof; and disposing the substrate on the keyboard in a continuous manner to cover the keyboard.

11. The method as claimed in claim 10, further comprising applying an adhesive layer on the substrate prior to coating the self-healing layer.

12. The method as claimed in claim 10, wherein disposing the substrate comprises:

heating the substrate at a temperature in a range of 60° C. to 150° C. for a time duration in a range of 3 minutes to 60 minutes to cure the self-healing layer; and molding the substrate to conform to a shape of the keyboard.

13. The method as claimed in claim 10, wherein the substrate is of a material selected from one of polyester, polycarbonate, elastomers, or a combination thereof.

* * * * *